United States Patent [19]

Arens et al.

[11] Patent Number: 4,856,614

[45] Date of Patent: Aug. 15, 1989

[54] PROCESS AND DEVICE FOR SEISMIC PROSPECTING OF A MEDIUM WITH INDUCED WAVES CREATED ARTIFICIALLY IN A BORE-HOLE

[75] Inventors: Georges Arens, Croissy sur Seine; Jacques Delvaux, Pau; Pierre Gros, Buc, all of France

[73] Assignee: Societe Nationale Elf Aquitaine (Production), Courbevoie, France

[21] Appl. No.: 208,087

[22] Filed: Jun. 17, 1988

[30] Foreign Application Priority Data

Jun. 19, 1987 [FR] France ................................ 87 08599

[51] Int. Cl.$^4$ .............................................. G01V 1/40
[52] U.S. Cl. ..................................... 181/104; 181/111; 181/400; 367/31; 367/151; 367/911
[58] Field of Search ................................ 181/102–108, 181/111, 112, 401; 367/25, 27, 31, 33, 55, 57, 151, 911, 912

[56] References Cited

U.S. PATENT DOCUMENTS

| | | | |
|---|---|---|---|
| 3,054,471 | 9/1962 | Knudsen | 181/102 |
| 4,319,345 | 3/1982 | Dennis | 367/25 |
| 4,575,828 | 3/1986 | Williams | 367/31 |
| 4,575,830 | 3/1986 | Ingram et al. | 367/26 |
| 4,611,685 | 9/1986 | Curran | 181/102 |
| 4,632,212 | 12/1986 | Benzing | 181/106 |
| 4,718,046 | 1/1988 | Medlin | 367/31 |
| 4,751,688 | 6/1988 | Paulsson | 367/36 |

FOREIGN PATENT DOCUMENTS 1349049 12/1963 France .
2040577 1/1971 France .
2534696 4/1984 France .

Primary Examiner—Brian S. Steinberger
Attorney, Agent, or Firm—Foley & Lardner, Schwartz, Jeffery, Schwaab, Mack, Blumenthal & Evans

[57] ABSTRACT

The process consists in generating a primary tube wave, in using a reflecting element for the tube wave and in recording the times of emission of the induced waves radiated by the reflecting element, in receiving and recording at least part of the induced waves, then in processing the recorded signals so as to determine the characteristics of the medium to be explored. Application in particular to exploration between boreholes.

23 Claims, 5 Drawing Sheets

FIG_1

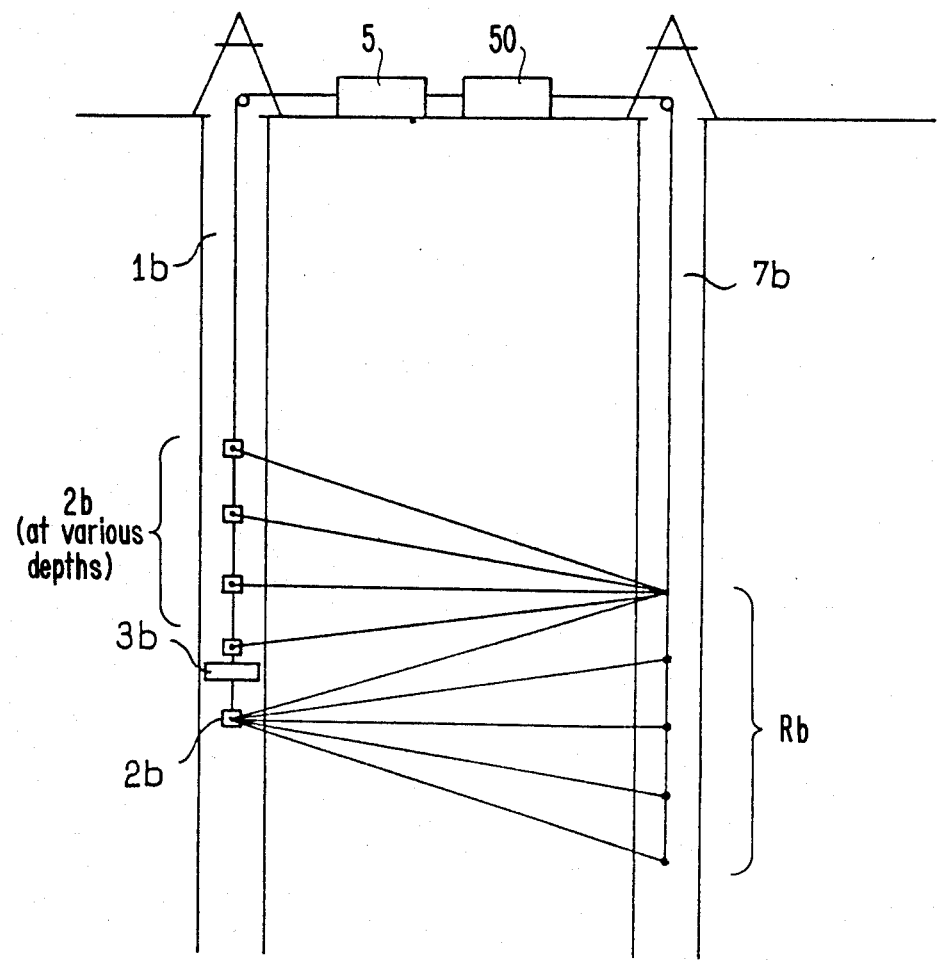
FIG_3

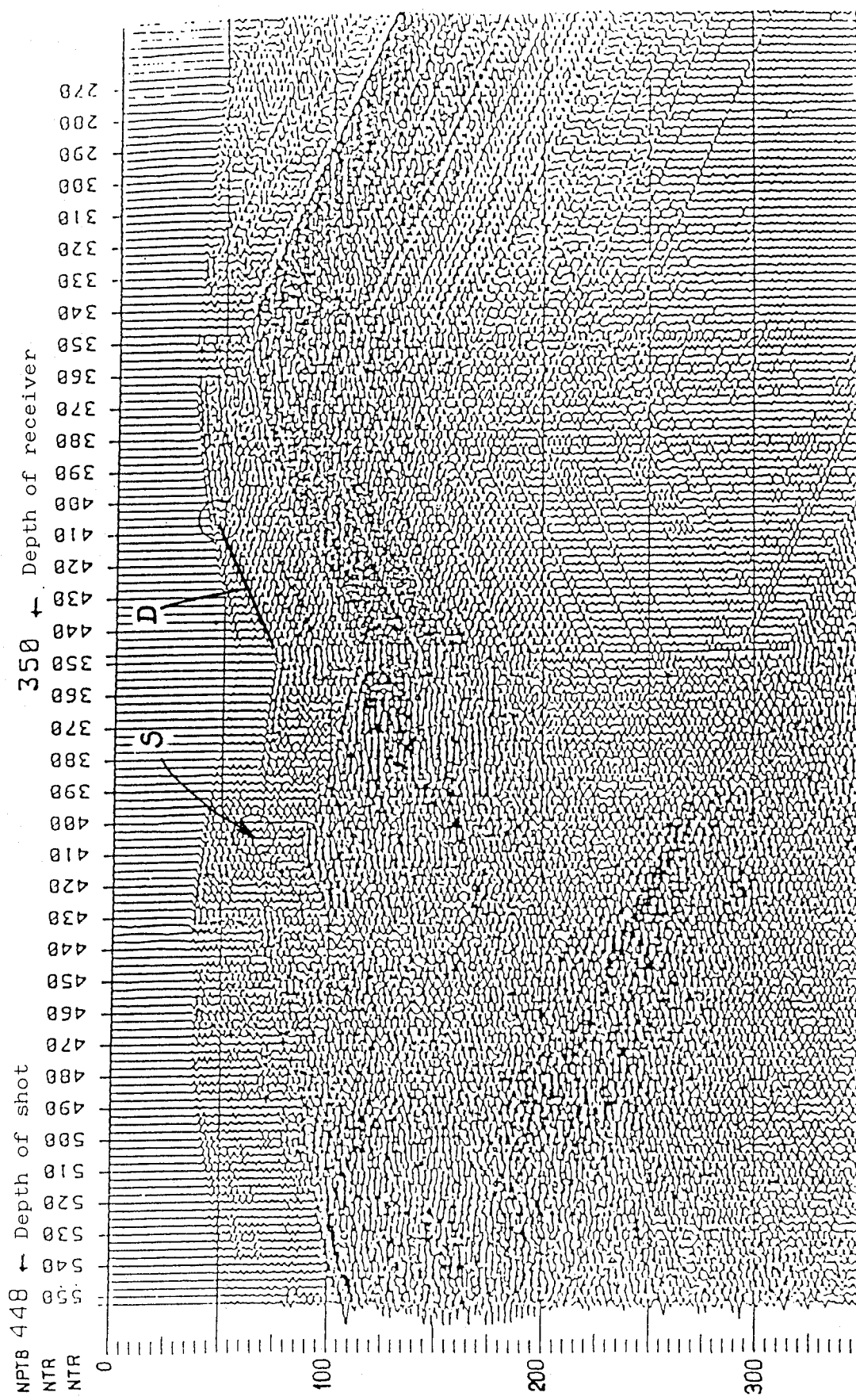
FIG._4

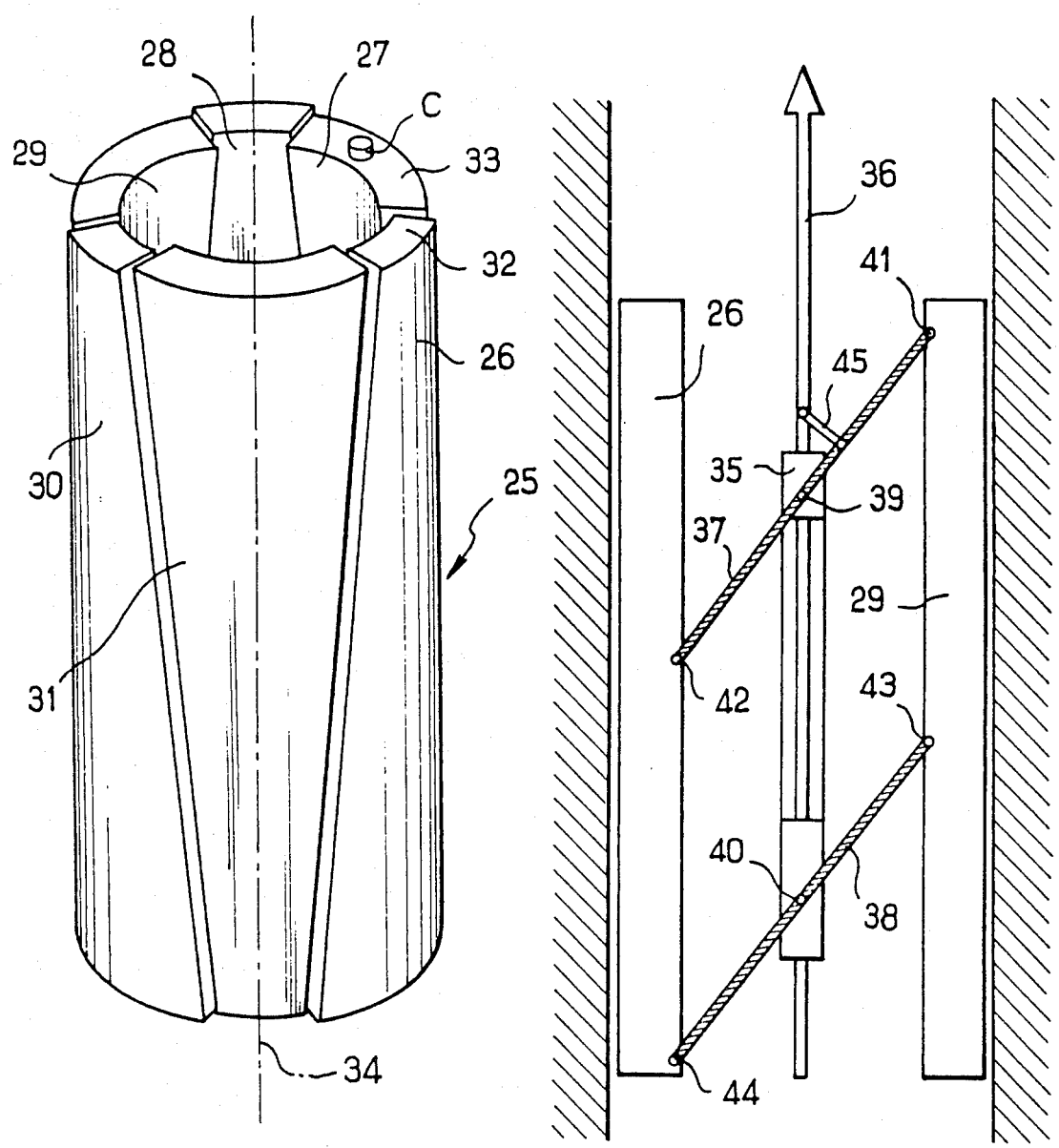
FIG_5
FIG_6

PROCESS AND DEVICE FOR SEISMIC PROSPECTING OF A MEDIUM WITH INDUCED WAVES CREATED ARTIFICIALLY IN A BORE-HOLE

The present invention relates to a process and a device for the artificial creation of induced waves in a drilled bore-hole and, more particularly, in a bore-hole in which there is present any fluid whatsoever such as drilling mud.

When a primary wave is emitted, from a source situated either on the surface or in a bore-hole full of fluid, there are produced what it is agreed to call volume waves such as compression and shear waves which are propagated in the medium surrounding the said bore-hole, and surface waves which are propagated along the walls of the said bore-hole.

Since the compression and shear waves are the first to arrive at the receiving devices placed at a certain fixed distance from the source, interest has until recently been concentrated on these waves only, for determination of the lithological characteristics for example of the medium traversed by the bore-hole and in which the said volume waves are propagated. Recording of the signals of the waves received by the receivers enables in particular to obtain what is known as a vertical seismic profile.

In constrast to surface seismology, acoustic diagraphy leads to a better knowledge of the physical characteristics of the medium close to and surrounding the bore-hole, since in particular it takes into consideration waves other than compression waves, such as shear waves and/or surface waves. Amongst the processes and devices of acoustic logging which have led to considerable improvements in taking into account all the waves propagated in the medium surrounding the bore-hole, that known by the name "EVA", of ELF AQUITAINE, may be mentioned.

In the presence of layers where the velocity of propagation of volume waves is high, it is in fact possible to record shear waves before the arrival of surface waves. When the said velocity of propagation is small, the surface waves arrive before or at the same time as the shear waves and almost blot out these latter, which are then of little or no use.

In all cases the waves used in the first instance are the volume waves, which are better known since they were the first to be observed and analyzed.

In certain cases, the tube waves, which are most frequently neglected in favour of other better-known waves, transport energies which can be very substantial. When the primary source used is not coupled, that is freely suspended by a traction cable, and has a wide spectrum, such as a sparker for example, the tube waves may account for up to 95% of the energy radiated by the said primary source; the remainder of the energy, say 5% approximately, gives rise to volume waves.

Now, when the bore-hole passes through two geological layers different in nature, there is a discontinuity in impedance at the separation or interface of the said geological layers. The tube waves falling on the said surface give rise to a secondary emission with an energy which can be of the same order of magnitude as that of the primary emission.

Such a phenomenon has rarely been clearly demonstrated, because geophysicists try to avoid as far as possible any emission or recording of tube waves, but above all because the best conditions for observation of such a secondary emission were never satisfied.

The object of the present invention is to propose the use of tube waves to create volume waves, in such a manner as to provide increased knowledge of the characteristics of the medium through which the bore-hole passes.

For this purpose, the present invention proposes the application of a seismic activity in the bore-hole, by the artificial creation of a secondary emission in a bore-hole even if, in a zone of the bore-hole in question, there is no interface or natural discontinuity of impedance.

The process according to the invention consists in:
generating, starting from a primary source of emission, at least one primary tube wave which is propagated along the walls of the said bore-hole,
placing in the bore-hole at least one element to reflect the said tube wave,
recording the emission times of the induced waves radiated by the said reflecting element,
receiving by receiving devices at least part of the induced waves,
recording, in the form of signals, the waves received by the receivers,
then processing the said signals in order to determine the characteristics of the medium to be explored.

In a device for carrying out the process, the primary source of emission and the reflecting element are positioned in the bore-hole, the receiving devices being positioned in another bore-hole.

One advantage of the present invention lies in the fact that the secondary emission due to the tube waves can be used at any place in a bore-hole and it is possible to determine, after processing of the signals recorded, the physical characteristics of the medium separating the reflector element from the receiving devices, whether the medium is homogeneous or heterogeneous.

Other characteristics, which are given in the other claims, and other advantages will become apparent from the description of a process and of a device for carrying out the said process, which are given as an indication of several preferred embodiments of the invention, without implying a limitation, as well as from the attached drawing on which:

BRIEF DESCRIPTION OF DRAWINGS

FIG. 3 is a diagrammatic representation combining the two methods shown on FIGS. 1 and 2.

FIG. 4 is a collection of seismic traces obtained by the combined method shown on FIG. 3.

FIG. 5 is a perspective view of the means of secondary emission.

FIG. 6 is a simplified cross-sectional view of the means of secondary emission suspended on the means of displacement in accordance with one embodiment of the invention.

Figure 1:
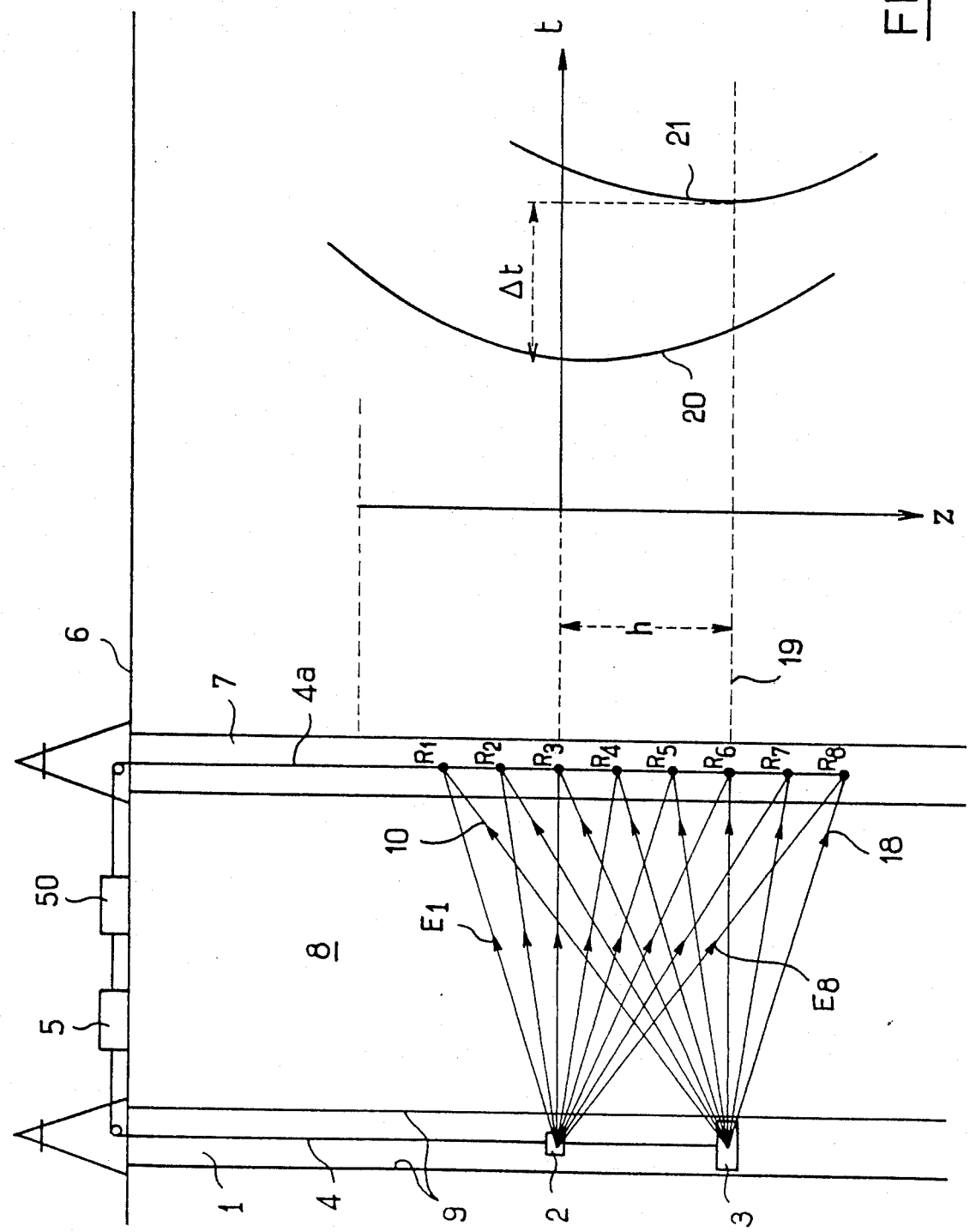
FIG. 1 is a diagrammatic representation of a first method of production and use of the induced waves and indications of the corresponding recorded signals.

Referring back to FIG. 1, into a bore-hole 1 there are lowered and then fixed at a determined depth, a primary source of emission 2 which, preferably, is not coupled and has a wide spectrum, such as a sparker for example, and also a reflector element capable of generating a secondary emission and which will be referred to in its entirety by the term secondary source 3. The means of displacement and fixing in the bore-hole are not described in detail and consist simply of a traction cable 4 controlled by controls 5 situated at the ground surface 6.

Into another bore-hole 7 distinct and separated by a certain distance from bore-hole 1, there is lowered a series of receivers, eight for example in the example shown on FIG. 1 and labelled $R_1$ to $R_8$, which are usually equidistant between themselves and capable of being moved within the bore-hole 7 by means of a traction cable 4 controlled by the same controls 5 or by different means.

When the primary source 2 is excited, energy is radiated in all directions in the form of volume and surface waves. Certain of these volume waves are propagated through the medium 8 situated between the bore-holes 1 and 7 and are shown on FIG. 1 by the paths $E_1$ to $E_8$, of which only the first $E_1$ and the last $E_8$ are labelled, the said waves being detected and recorded in the form of electrical signals by each of the receivers $R_1$ to $R_8$.

The greater part of the energy radiated by the primary source 2 is propagated in the form of a tube wave along the wall 9 of bore-hole 1. The tube wave is intercepted by the secondary source 3 which gives rise to a secondary emission in the form of induced waves shown by the paths 10 to 18, and which are detected and then recorded by the same receivers $R_1$ to $R_8$. For reasons of clarity, only paths 10 and 18 are shown on FIG. 1. In fact, everything takes places as if to the right of the secondary source 3 there were a reflector or interface in the medium 8 as shown on FIG. 1 by a dotted line 19 and separating two imaginary geological layers.

The induced waves radiated by the secondary source 3 are volume waves such as compression and shear waves detected by the receivers $R_1$ to $R_8$, as well as tube waves being propagated along the walls of bore-hole 1.

The signals recorded by the receivers $R_1$ to $R_8$ on each emission from the primary source 2 are processed in the processing devices 50 in order to provide indicators hyperbolic in shape shown on the right of FIG. 1. The indicators 20 and 21 make it possible to determine the times t of the firts signals to arrive as a function of the depth Z.

The indicator 20 is centred on the primary source 2 whilst the indicator 21 is centred on the secondary source 3, the time interval t between the primary and secondary emissions being equal to $h/V_t$ where h is the vertical distance between the primary source 2 and the secondary source 3, and $V_t$ is the velocity of the tube wave in bore-hole 1.

By simultaneous or separate displacement of the primary source 2 and the secondary source 3, several families of indicators are obtained, similar to those mentioned above, and which can be used as a basis for the determination of the physical characteristics of the geological layers traversed by the bore-holes 1 and 7.

Figure 2:
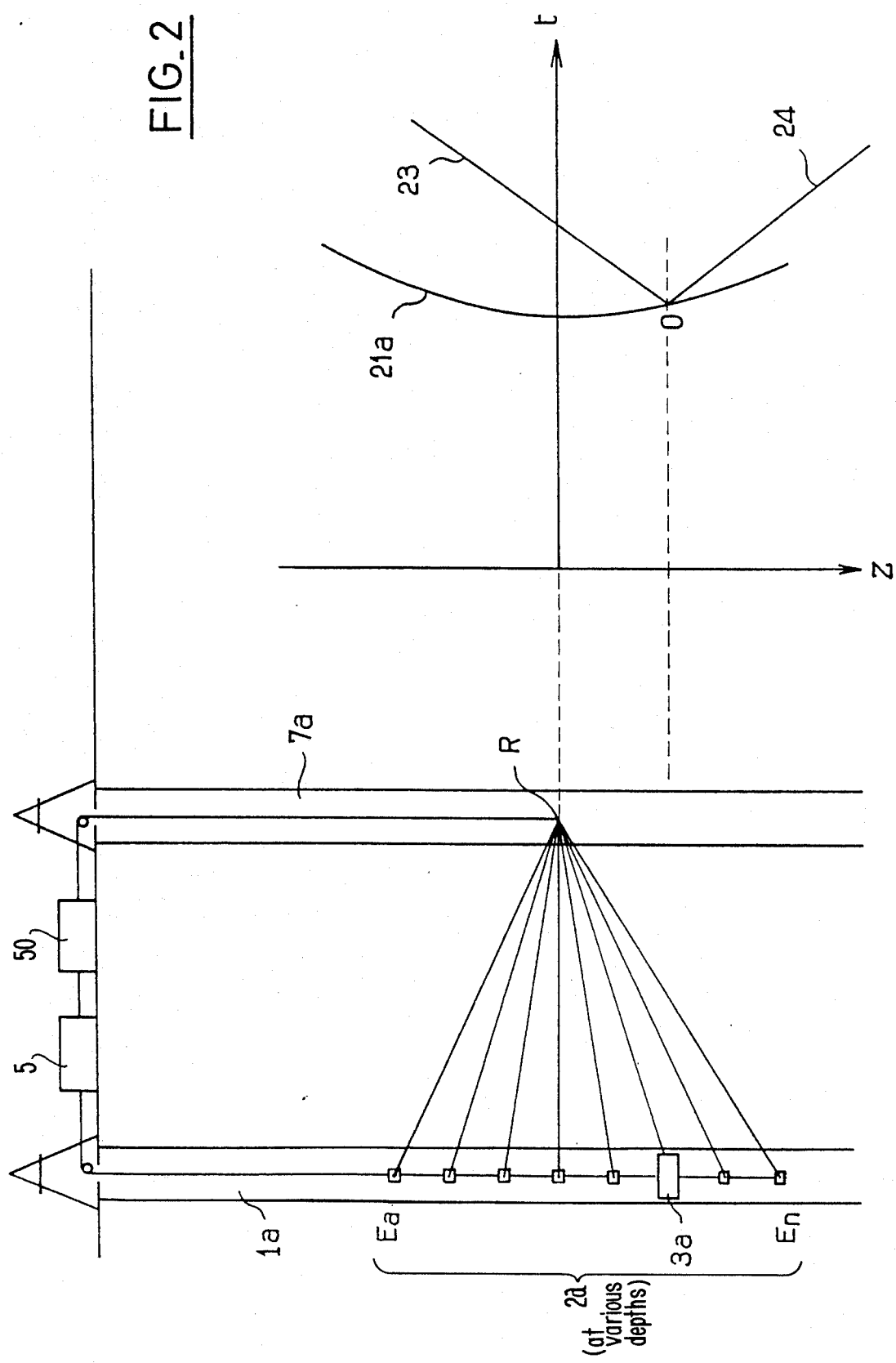
FIG. 2 is another diagrammatic representation of a second method of production and use of the induced waves and indications of the corresponding recorded signals.

In the mode of emission shown on FIG. 2, a fixed receiver is used, situated in bore-hole 7a, along with a fixed secondary source 3a in bore-hole 1a, the primary source of emission 2a being displaced within the bore-hole 1a at regular intervals, and occupying successively the pre-determined positions Ea to Eh.

With regard to the paths shown on FIG. 2, everything takes place as if the emission were from R and the reception at the different positions Ra to Rh. The indicator 21a linked to the first arrivals therefore has the form of a conventional hyperbola and is centred on the point R.

The induced emissions due to the secondary source 3a appear in this case on the regrouping of seismic traces in the form of two terminating straight lines 23 and 24. In fact, since the relative positions of the means of secondary emission and of reception are fixed both at emission and at reception, and the path between secondary source and receiver R is invariant and common to all primary emissions, and in addition the time interval between primary emission and induced emission varies linearly with the distance h between the mobile primary source 2a and the fixed secondary source 3a, in accordance with the displacements of the said primary source 2a, the terminating straight line 23 represents the arrivals of the induced waves for the medium situated above the induced source 3a, whilst the terminating straight line 24 represents the arrival of the induced waves for the medium situated below the said secondary source 3a. The lines 23 and 24 cut the indicator 21a at the point 0 for which the two arrivals are simultaneous, that is the primary source 2a coincides with the secondary source 3a. The gradient of the lines 23 and 24 depends on the velocity of the tube wave generated by the primary source 2a.

FIGS. 3 and 4 show a combined mode of FIGS. 1 and 2, realized under the following conditions:

In the first phase, the primary source 2b is placed at a depth of 448 m in bore-hole 1b and the secondary source 3b is placed at a depth of 405 m in the same bore-hole 1b. The primary emission is repeated 80 times at the same place. Recording of the primary waves generated by the primary source and of the induced waves generated by the secondary source is effected by means of receivers Rb, situated at intervals of 2.5 m in bore-hole 7b, between 550 m and 350 m. Recordings of this type or grouped traces are shown in part on the left-hand side of FIG. 4 and are named direct emission.

Following this first set of results, a transposed emission is carried out in which the secondary source 3b is still at 405 m in bore-hole 1b, and the receiver is situated in bore-hole 7b at 350 m. The primary source is moved within bore-hole 1b 80 times at depths between 448 m and 250 m. The collection of traces recorded is shown on the right-hand half of FIG. 4.

Analysis of the two collections of traces on FIG. 4 brings out the fact that they have one trace in common: that corresponding to the positioning of the primary source at 448 m with a receiver at 350 m. In addition, the secondary emission is visible between 50 and 80 milliseconds, at the junction of the two seismic sections. Such a secondary emission is shown on the drawing by the intersection at the level of the common trace, towards 75 ms, of the indicators previously described, that is an indicator hyperbolic in nature (on the left) with its peak S somewhere between 400 and 410 m, and a terminated straight line D intercepting the first arrival (on the right), with the intersection at about 405 m. The agreement between these two collections of traces is particularly clear since the secondary source was placed at the center of the receiving equipment. The energy thus converted is substantial, equivalent or even greater than that of the the direct emission recorded on the same traces.

The present invention therefore makes it possible to cause artificially a secondary emission at any depth whatsoever, by placing as required a discontinuity in impedance in a bore-hole, for example a metallic mass with values of velocity and density substantially different from those of the fluid circulating in the said bore-hole.

It must also be noted that the yield of the secondary source is relatively constant whatever the depth, and easy to realize since easily moved, requiring only a traction cable.

In addition, the primary source generating the tube wave may now be placed at the surface or not very deep in the bore-hole.

It is to be noted that a very important advantage of the present invention lies in the fact that it is no longer necessary to make use of a primary source deep in the well at predetermined positions.

The interference taking place between the waves generated by the direct emission and the secondary emission becomes less as the distance between the surface and the secondary source increases. In fact, the waves originating from the direct emission pass through the first layers of the medium, known as the WZ, and are rapidly attenuated, whilst the secondary emission is created at a depth, close to the objective.

In order to make it possible to use the seismic data thus recorded, it is necessary to have available a time origin synchronous with the secondary emission. For this purpose a captor C is used, consisting of a hydrophone integral with the secondary source lowered into the bore-hole. The captor C, FIG. 5, detects the arrival of the primary tube wave and the zero instant of the secondary emission; the information so collected is transmitted to the surface by means of suitable lines, located for example inside the traction cable 4.

The secondary source 3, 3a or 3b, shown diagrammatically on FIGS. 1 to 3, may consist of a solid metallic mass, or preferably a hollow mass, with its external wall close to the wall of the bore-hole into which it is lowered. In fact if the annular space between the walls of the metallic mass and the walls of the tube were to be large and full of fluid, the tube wave produced by the primary source would be less perturbed by the secondary source since the amplitude maximum of this wave is situated on the wall, and a large part of the energy which could be radiated by the said metallic mass may be lost. It is for this reason that it is preferable to provide a passage in the metallic mass sufficient for the fluid in circulation in the bore-hole and to reduce the annular space as far as possible. One embodiment of the secondary source is shown on figures 5 and 6.

The secondary source is a hollow cylinder 25 of variable diameter, consisting of six cylindrical sectors 26 to 31, each being wedge-shaped. The wedge-shaped cylinders 26 to 31 are of different weights and are positioned with respect to one another in such a manner that the cylinder possesses circular bases at its ends. For this purpose a small base 32 of a lighter wedge-shaped sector 26 is alternated with a large base 33 of the adjacent heavier wedge-shaped sector 27, the axis 34 of the cylinder being probably the axis of the bore-hole. By this means, each small base of a sector 32 is opposed by a large base 33 of the sector in question.

One manner of connecting the different sectors 26 to 31 to each other and of moving the cylinder 25 within the bore-hole is shown on FIG. 6.

A sleeve 35 is mounted so as to slide over a support stem 36 which is integral with the traction cable. The two opposing cylindrical sectors, for example 26 and 29 or 28 and 31, are connected together by two large rods 37 and 38 which are also able to pivot by means of the articulations 39 and 40 on the sleeve 35. One extremity 41 of the rod 37 is articulated on the upper part of the sector 29, the other extremity 42 being articulated effectively at the middle of sector 26 opposite sector 29. The rod 38 is articulated by its extremities 43 and 44 respectively at the lower part of sector 26. The two rods 37 and 38 form, along with the sectors 26 and 29, a deformable parallelogram which is capable of moving the sectors 26 and 29 relative to each other in such a manner as to allow easy positioning and/or raising of the cylinder 25. A small connecting rod 45 is provided between rod 37 and the support stem 36. It is evident that other pairs of connecting rods similar to those which have just been described are provided between the other sectors of the cylinder 25. The opening of cylinder 25 at the predetermined position in the bore-hole is carried out by gravity due to the difference in weight between the wedge-shaped sectors, cylinder 25 opening out to allow the application of the said sectors onto the walls of the bore-hole.

Depending on the distance between the primary source and the secondary source, and in the case of a seismic exploration between bore-holes, it may be desirable to reinforce or attenuate the multiple tube waves. In fact, one part of each induced wave emitted by the secondary source is propagated in the form of an induced tube wave along the walls within which the said secondary source is positioned. This fact leads to the creation of multiple tube waves.

When the distance between the primary and secondary sources is large, of the order of 1,500 m, it is desirable to reinforce the arrival of the multiple tube waves by addition with their repetition period, in such a manner as to eliminate the volume waves produced by the primary source and to reinforce those produced by the secondary source. One method of effecting such a reinforcement would be to position another secondary source immediately above the primary source.

When the distance between the primary and secondary sources is smaller, of the order of 500 m for example, the multiple tube waves lead to a mixture of the induced volume waves produced by the secondary source. In this case it is desirable to attenuate the said multiple waves as much as possible. Such an attenuation could be effected by placing attenuating equipment at the top of the bore-hole, so as to absorb the said multiple tube waves, for example by creating an opposition in phase between the said multiple tube waves.

Of course, the invention is in no way limited to the embodiments which have been described and illustrated; it can form the subject of numerous variants accessible to those skilled in the art, according to the applications envisaged, without exceeding the framework of the invention.

What is claimed is:

1. A process for seismic prospecting of a medium based on induced waves created artificially in a bore-hole, comprising:

generating, starting from a primary source of emission, at least one primary tube wave and at least one primary volume wave, said primary tube wave being propagated along the walls of said bore-hole, said primary volume wave being propagated through a medium to be explored, placing an artificial reflecting element for said primary tube wave within the bore-hole, inducing at least one secondary volume wave with said reflecting element, said secondary wave propagates through said medium to be explored, recording the times of emission of the induced secondary waves which are radiated by said reflecting element, receiving by receiving devices at least part of the induced secondary waves and primary volume waves, recording, in the form of signals, the waves received by the receiving devices, processing said signals in order to determine characteristics of the medium to be explored.

2. The process according to claim 1, wherein the primary source of emission and the receiving devices are positioned on a surface of the medium to be explored, the reflecting element being positioned in the bore-hole.

3. The process according to claim 1, wherein the primary source of emission and the reflecting element are positioned in the bore-hole, the receiving devices being positioned on a surface of the medium to be explored.

4. The process according to claim 1, wherein the primary source of emission is positioned on a surface of the medium to be explored, the reflecting element being positioned in the bore-hole and the receiving devices in another bore-hole.

5. The process according to claim 1, wherein the primary source of emission and the reflecting element are positioned in the bore-hole, the receiving devices being positioned in another bore-hole.

6. The process according to claim 1, which consists in generating the primary tube wave at regular intervals of time, maintaining the reflecting element in a fixed position in the bore-hole, and displacing the receiving devices so that to each primary wave emitted there corresponds one position of the receiving devices.

7. The process according to claim 1, wherein the receiving devices are fixed, the reflecting element being displaced in the bore-hole so that to each primary tube wave emitted there corresponds one position of the said reflecting element.

8. The process according to claim 5, wherein the reflecting element and the receiving devices are fixed, and the source of primary emission is displaced within the bore-hole between two consecutive emissions.

9. A device for seismic prospecting of a medium, comprising:

single means for emitting a primary tube wave along the walls of a first bore-hole, and for emitting at least one primary volume wave into the walls of the first bore-hole, a reflecting element positioned in said first bore-hole for receiving the tube wave and forming a source of emission of induced waves, means for reception of said induced waves and said primary volume waves, said means for reception being positioned in a second bore-hole separate from the first bore-hole, and means for recording in the form of signals said waves received by said means for reception.

10. The device according to claim 9, which additionally comprises means for recording the times of emission of the said induced waves.

11. The device according to claim 9, wherein the reflecting element forming the source of emission of the said induced waves takes the form of a metallic mass.

12. The device according to claim 9, wherein the reflecting element forming the source of emission of the induced waves takes the form of a hollow metallic cylinder suspended by means of displacement which is movable in the first bore-hole to bring the hollow cylinder to various positions within said first bore-hole.

13. The device according to claim 12, wherein the hollow cylinder comprises wedge-shaped sectors of the cylinder.

14. The device according to claim 13, wherein the wedge-shaped sectors of the cylinder are arranged in pairs in such a manner that in each pair a smaller base of one of said sectors is adjacent to a larger base of the other sector.

15. The device according to claim 14, wherein the two wedge-shaped cylindrical sectors of each pair are articulated at the extremities of a connecting rod which is mounted so as to pivot freely on a sleeve suspended on a traction stem, said sleeve and traction stem constituting said means of displacement.

16. The device according to claim 15, wherein the wedge-shaped cylindrical sectors of each pair are joined to each other by means of two connecting rods, one of said rods being articulated by a link stem onto the traction stem.

17. The device according to claim 15, wherein the means of recording the times of emission of the induced waves comprise, a receiver mounted on the cylinder.

18. The device according to claim 13, wherein adjacent wedge-shaped sectors differ in weight.

19. The device according to claim 9, wherein the means of emission of the primary wave are positioned at a surface of the first bore-hole.

20. The device according to claim 9, wherein the means for emitting the primary wave are positioned in the first bore-hole above said reflecting element.

21. The device according to claim 9, wherein the means for reception comprises receivers spaced regularly along a support beam which is displaceable within the second bore-hole.

22. The device according to claim 9, wherein the reflecting element differs in velocity and density from the velocity and density of the said first bore-hole.

23. A method for seismic prospecting, comprising:

generating at least one primary tube wave and at least one primary volume wave from a primary source, said primary tube wave being propagated along the walls of a first bore-hole, said primary volume wave being propagated through a medium to be explored;

intersecting said primary tube wave with an artificial means for reflecting waves;

inducing at least one secondary volume wave which propagates through said medium to be explored; and receiving with receptors at least a portion of said primary and secondary volume waves in order to determine characteristics of the medium to be explored.

* * * * *